United States Patent
Komi et al.

(10) Patent No.: US 9,509,992 B2
(45) Date of Patent: Nov. 29, 2016

(54) VIDEO IMAGE COMPRESSION/DECOMPRESSION DEVICE

(71) Applicant: HITACHI INFORMATION & TELECOMMUNICATION ENGINEERING, LTD., Kanagawa (JP)

(72) Inventors: Hironori Komi, Tokyo (JP); Yusuke Yatabe, Tokyo (JP); Kyohei Unno, Tokyo (JP); Yoshiyuki Motoba, Yokohama (JP); Toshiaki Hori, Yokohama (JP); Yoshimasa Kashihara, Yokohama (JP); Toshikazu Yanagihara, Yokohama (JP)

(73) Assignee: HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 221 days.

(21) Appl. No.: 14/133,911

(22) Filed: Dec. 19, 2013

(65) Prior Publication Data

US 2014/0177710 A1    Jun. 26, 2014

(30) Foreign Application Priority Data

Dec. 20, 2012  (JP) ................... 2012-278274

(51) Int. Cl.
*H04N 11/02*  (2006.01)
*H04N 19/50*  (2014.01)
(Continued)

(52) U.S. Cl.
CPC ...... *H04N 19/00569* (2013.01); *H04N 19/109* (2014.11); *H04N 19/132* (2014.11);
(Continued)

(58) Field of Classification Search
USPC ........................... 375/240.01–240.29
See application file for complete search history.

(56) References Cited

U.S. PATENT DOCUMENTS

| 4,484,265 A | * | 11/1984 | Czekalski | G06F 12/02 342/195 |
| 4,605,961 A | * | 8/1986 | Frederiksen | H04N 7/1696 348/E7.056 |

(Continued)

FOREIGN PATENT DOCUMENTS

| EP | 1 853 067 A1 | 11/2007 |
| JP | 2003-230148 A | 8/2003 |

(Continued)

OTHER PUBLICATIONS

European Search Report for European Application No. /Patent No. 13198628 3-1908, dated Apr. 7, 2014.
(Continued)

*Primary Examiner* — Leron Beck
(74) *Attorney, Agent, or Firm* — Baker Botts, L.L.P.

(57) ABSTRACT

An image compression/decompression device achieving increased utilization efficiency of the memory bandwidth in the access to the memory used for the compression/decompression operation while maintaining ill effect on the images at a low level is realized. The image compression/decompression device comprises a data conversion unit which reduces the data access rate when original images (as input images at the time of performing the compression) and reference images (used for performing the interframe prediction) are stored in the memory by accessing the memory. The access to the memory is performed in an address sequence (order) that differs between data write and data read. This makes it possible to increase the utilization efficiency of the memory bandwidth, and further to reduce the capacity of the buffer memory used for the data read.

2 Claims, 4 Drawing Sheets

(51) Int. Cl.
*H04N 19/172* (2014.01)
*H04N 19/61* (2014.01)
*H04N 19/109* (2014.01)
*H04N 19/132* (2014.01)
*H04N 19/136* (2014.01)
*H04N 19/156* (2014.01)
*H04N 19/42* (2014.01)
*H04N 19/426* (2014.01)
*H04N 19/577* (2014.01)

(52) U.S. Cl.
CPC .......... *H04N19/136* (2014.11); *H04N 19/156* (2014.11); *H04N 19/172* (2014.11); *H04N 19/42* (2014.11); *H04N 19/426* (2014.11); *H04N 19/428* (2014.11); *H04N 19/577* (2014.11); *H04N 19/61* (2014.11)

(56) References Cited

U.S. PATENT DOCUMENTS

| | | | | |
|---|---|---|---|---|
| 4,647,971 A * | 3/1987 | Norman, III | ........... | H04N 5/262 345/672 |
| 4,985,766 A * | 1/1991 | Morrison | ............. | H04N 21/242 375/240.05 |
| 5,708,511 A * | 1/1998 | Gandhi | ................ | H04N 19/50 375/E7.088 |
| 5,781,788 A * | 7/1998 | Woo | ................ | H04N 19/61 370/276 |
| 6,097,843 A | 8/2000 | Takashima et al. | | |
| 6,188,793 B1 * | 2/2001 | Kimura | .................. | H04N 1/41 375/E7.088 |
| 6,198,773 B1 * | 3/2001 | Gill | ................ | H04N 19/61 348/716 |
| 6,198,850 B1 * | 3/2001 | Banton | .................. | H04N 1/41 358/426.02 |
| 7,190,284 B1 * | 3/2007 | Dye | ...................... | G06F 12/023 341/51 |
| 7,522,664 B1 * | 4/2009 | Bhaskar | ............. | G01N 21/9501 348/126 |
| 2003/0147468 A1 | 8/2003 | Matsumura et al. | | |
| 2005/0078513 A1 * | 4/2005 | Tatsukawa | ............. | G11C 16/10 365/185.01 |
| 2005/0111537 A1 * | 5/2005 | Sunter | ............. | G01R 31/31709 375/226 |
| 2009/0257485 A1 | 10/2009 | Youn | | |
| 2010/0104021 A1 * | 4/2010 | Schmit | ............. | H04N 19/00151 375/240.24 |
| 2014/0047199 A1 * | 2/2014 | Kim | ...................... | G06F 12/04 711/154 |

FOREIGN PATENT DOCUMENTS

JP        3918263 B2       5/2007
JP     2010-171609 A      8/2010

OTHER PUBLICATIONS

Gupte, et al., "Memory Bandwidth and Power Reduction Using Lossy Reference Frame Compression in Video Encoding", IEEE Transactions on Circuits and Systems for Video Technology, vol. 21, No. 2, Feb. 2011, pp. 225-230.

Budagavi et al., "Video Coding Using Compressed Reference Frames", IEEE, 2008, pp. 1165-1168.

Office Action, mailed Dec. 8, 2015, which issued during the prosecution of Japanese Patent Application No. 2012-278274, which corresponds to the present application.

* cited by examiner

FIG. 3
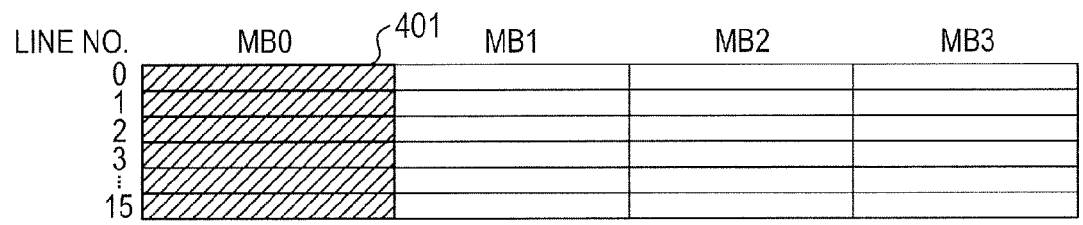
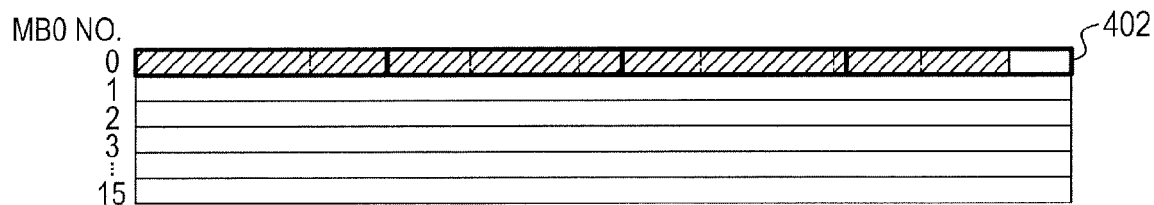
FIG. 4
| ORIGINAL IMAGE 0 | ~100 |
| --- | --- |
| ORIGINAL IMAGE 1 | ~101 |
| ORIGINAL IMAGE 2 | ~102 |
| REFERENCE IMAGE I | ~103 |
| REFERENCE IMAGE P | ~104 |
| REFERENCE IMAGE B | ~105 |
| STREAM STORAGE AREA | ~106 |
| VIDEO I/F WORK AREA | ~107 |
| VIDEO PROCESSING WORK AREA | ~108 |
| HOST CPU WORK AREA | ~109 |
| STREAM I/F WORK AREA | ~110 |

FIG. 5

| | ORIGINAL IMAGE | REFERENCE IMAGE I | REFERENCE IMAGE P | REFERENCE IMAGE B | REMARKS |
|---|---|---|---|---|---|
| COMPRESSION MODE 1 | Lossless | Lossless | Lossless | Lossless | HIGH IMAGE QUALITY WITH B REFERENCE |
| COMPRESSION MODE 2 | Lossless | Lossless | Lossless | Lossless | HIGH IMAGE QUALITY WITHOUT B REFERENCE |
| COMPRESSION MODE 3 | Lossy | Lossless | Lossless | Lossless | STANDARD IMAGE QUALITY WITH B REFERENCE |
| COMPRESSION MODE 4 | Lossy | Lossless | Lossless | Lossy | STANDARD IMAGE QUALITY WITHOUT B REFERENCE |
| DECOMPRESSION MODE 1 | — | Lossless | Lossless | Lossless | HIGH IMAGE QUALITY WITH B REFERENCE |
| DECOMPRESSION MODE 2 | — | Lossless | Lossless | Lossy | STANDARD IMAGE QUALITY WITHOUT B REFERENCE |
| DECOMPRESSION MODE 3 | — | Lossless | Lossy | Lossy | LOW IMAGE QUALITY FOR PREVIEW |

VIDEO IMAGE COMPRESSION/DECOMPRESSION DEVICE

INCORPORATION BY REFERENCE

This application relates to and claims priority from Japanese Patent Application No. 2012-278274 filed on Dec. 20, 2012, the entire disclosure of which is incorporated herein by reference.

BACKGROUND OF THE INVENTION (1) Field of the Invention

The present invention relates to a video image compression/decompression device, and in particular, to a technology for increasing the utilization efficiency of the access bandwidth to the memory storing image frames when the image compression/decompression process is carried out.

(2) Description of the Related Art

In the field of system LSIs for executing video image processing, there have been disclosed techniques for suppressing the increase in the data rate when image data in the middle of signal processing is stored in a high-capacity memory such as a DDR3-SDRAM (Double Data Rate 3 Synchronous Dynamic Random Access Memory). For example, Japanese Patent Application laid-open No. 2010-171609 (hereinafter referred to as a "Patent Literature 1") has described a technique for relaxing the concentration of access to an SDRAM controller by performing lossless compression or lossy compression on the data by using correlation between multiple pieces of image data that are consecutive in the order of decoding and displaying the coded stream.

SUMMARY OF THE INVENTION

As to the application of the above invention to the image compression/decompression, however, the Patent Literature 1 has described no concrete techniques in regard to how to control the application of the lossless and lossy compressions and how to implement highly efficient memory access.

The object of the present invention is to resolve such problems and to implement an image compression/decompression device capable of increasing the utilization efficiency of the access bandwidth to the memory while maintaining ill effect on the images at a low level.

Means for solving the problem are described in the embodiments of the present invention.

According to the present invention, the utilization efficiency of the access bandwidth to the memory can be increased in an image compression/decompression device while maintaining ill effect on the images at a low level. This contributes to the improvement of the basic performance of the image compression/decompression device.

BRIEF DESCRIPTION OF THE DRAWINGS

These and other features, objects and advantages of the present invention will become more apparent from the following description when taken in conjunction with the accompanying drawings wherein:

FIG. 3 is an explanatory drawing for explaining read/write access by means of the block access in accordance with an embodiment of the present invention.

FIG. 4 is a schematic diagram showing an example of data allocation in an SDRAM in accordance with an embodiment of the present invention.

FIG. 5 is a schematic diagram showing an example of combinations of switching between lossless compression and lossy compression in accordance with an embodiment of the present invention.

DETAILED DESCRIPTION OF THE EMBODIMENT

Figure 1:
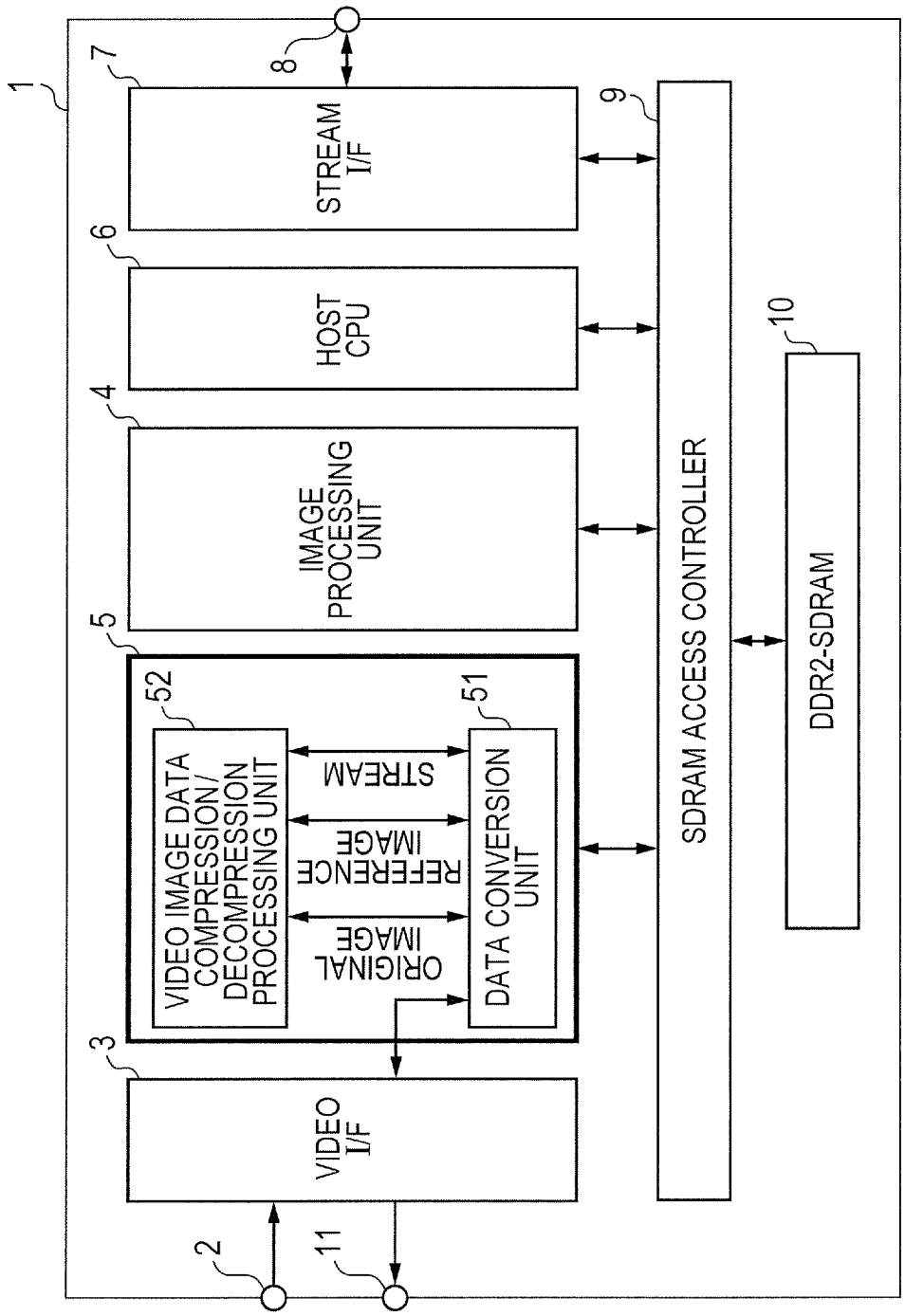
FIG. 1 is a block diagram showing an example of implementation of image compression/decompression in accordance with an embodiment of the present invention in a system LSI.

FIG. 1 is a block diagram showing an example of a system LSI 1 for image processing which is constructed by using a video image compression/decompression device in accordance with a first embodiment of the present invention. In FIG. 1, the block with the reference character 5 corresponds to the video image compression/decompression device of this embodiment. The video image compression/decompression device and the system LSI 1 will be explained below with reference to figures.

The image processing system LSI 1 is assumed to function as a device that performs real-time compression coding on video image data inputted through an image input terminal 2 and outputs the obtained data as stream data through a stream input/output terminal 8 so as to store the data in an externally connected storage medium (SD card, CompactFlash, etc.). The image processing system LSI 1 is also assumed to perform the following operations: The data once stored in the external storage medium is loaded into the LSI 1. After the video image decoding process is performed by the LSI 1, video images obtained by the decoding process are outputted through an image output terminal 11 to an external display (unshown) as motion video.

First, the operation for the video image compression will be explained. It is assumed in this example that video images having the resolution corresponding to Full HD are inputted through the image input terminal 2. In this case, the effective image size is assumed to be 1920 (horizontal)×1080 (vertical), and the frame rate is assumed to be 60 Hz in the progressive scanning method.

In this case, a video I/F unit 3 receives input data in a digital format (e.g., BT.709) successively as data in the horizontal scan line direction. The data is inputted as 4:2:2 components of luminance (Y) and color differences (Cb, Cr). After being converted into the 4:2:0 components as the standard format of H.264, the data is inputted to a video image compression/decompression processing unit 5. In this case, the data is assumed to be inputted in the scan line direction.

In the H.264 video image compression, the encoding of each of the input image frames is generally performed in a picture type selected from the following picture types depending on the type of encoding:

I picture (Intra picture): performing intra prediction (in-plane prediction) only P picture: performing unidirectional motion prediction on the temporal axis B picture: performing bidirectional motion prediction on the temporal axis In the case of a B picture, it is necessary to refer to frame image data of frames existing before and after the current frame (undergoing the compression process) in the temporal direction. Therefore, a plurality of input images (hereinafter referred to as "original images") are temporarily stored in the frame memory and the encoding process is carried out at the stage when the reference to the previous and next frames has become possible.

The data which has been compressed as an I, P or B picture is used as a reference frame for the motion prediction of other P and B pictures in the vicinity of the data. Therefore, the data after the compression is temporarily decoded in the compression device and stored in the frame memory for other references. Such data will be referred to as a "reference image".

In this embodiment, the inputted original images are stored in an external memory of the video image compression/decompression processing unit 5 to be used for the above process. In an example of this embodiment, a high-capacity DDR2-SDRAM 10 is connected as the external memory, an original image area is reserved in a prescribed memory space of the DDR2-SDRAM 10, and the inputted original images are successively stored in the original image area.

In this case, a data conversion unit 51 (of the video image compression/decompression processing unit 5) is configured to include a circuit which reduces the amount of data access to the SDRAM 10 (hereinafter referred to as a "bandwidth") by reducing the amount of the image data at the time of being stored in the external DDR2-SDRAM 10 by using a data compression technique simpler than that of a video image data compression/decompression processing unit 52 (of the video image compression/decompression processing unit 5).

The configuration of the internal circuit can be implemented by using a data compression circuit and a data decompression circuit described in FIG. 1 of the Patent Literature 1 with reference characters 13 and 17, for example. Detailed explanation of the circuitry is omitted here on the assumption that the aforementioned circuitry of the Patent Literature 1 is utilized in this embodiment.

The data compression circuit and the data decompression circuit used for the image data storage in the aforementioned DDR2-SDRAM 10 are represented as the data conversion unit 51 in this embodiment. The data conversion unit 51 is capable of reducing the amount of data (data quantity) by performing lossless compression or lossy compression on the data.

In regard to the lossy compression, it is possible to specify the worst case of the data quantity after the data conversion, by previously setting a worst compression ratio in a case where the compression ratio deteriorates the most. In the data compression performed by the circuit, it is assumed that data of a prescribed number of pixels are inputted as the input data and data compressed to approximately 40-60% of the original data quantity is outputted as the output data.

In this case, the compressed data is outputted as data sequentially packed in units of bits. Efficiency of the access to an SDRAM can generally be increased by performing the so-called burst access on the SDRAM. In a case where the burst length is 8 and the bit width of the SDRAM is 64 bits, for example, the access to the SDRAM is performed sequentially by handling 64 bits×8=512 bits (1 unit) as one burst. Thus, in cases where the data quantity is sequentially compressed to 60% at each stage when original image data of 2048 bits (4 units) have been inputted, the 4 units (1 unit=512 bits) of data are compressed to approximately 1229 bits. Thus, the 4 units of data can be outputted while packaging them in approximately 3 units.

Incidentally, there area cases where the data access sequence (the order of data access) for achieving efficient data read differs between the writing and the reading of the original images. In this embodiment, for example, the data input is performed by means of the line scan, whereas the data output is performed by means of access in units of MBs (Macro Blocks) commonly employed in H.264. Therefore, the data access in this embodiment is carried out according to the method explained below.

In the case of the original images, the data inputted in the scan line direction successively undergo the lossless compression conversion or the lossy compression conversion by the data conversion unit 51 and are stored in the DDR2-SDRAM 10.

Figure 2:
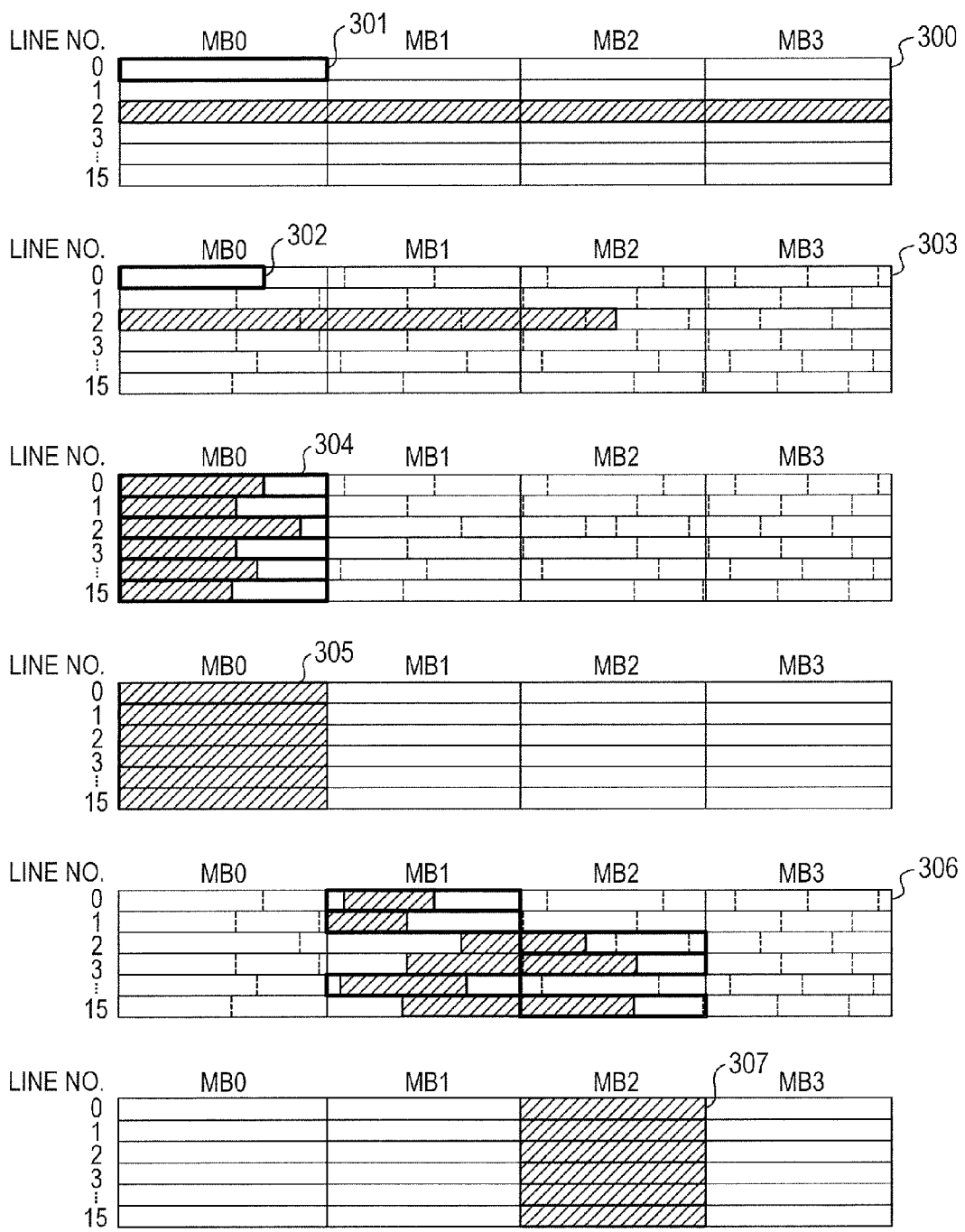
FIG. 2 is an explanatory drawing for explaining conversions for the line access and the block access in accordance with an embodiment of the present invention.

FIG. 2 is an explanatory drawing for explaining conversions for the line access and the block access in accordance with an embodiment of the present invention. The drawing 300 indicates the inputting of an original image in units of lines. The data is outputted to the data conversion unit 51 by means of the burst access in units corresponding to the range 301 (1 unit (512 bits) in the above example). In this case, each burst undergoes the data compression conversion by the data conversion unit 51.

For example, the data corresponding to the range 301 generally fits in a range within the original burst data number as indicated by the reference character 302. The compressed data is packed in units of bits. At each stage when compressed data corresponding to the burst length has been accumulated in the data conversion unit 51, the accumulated data is transferred to an SDRAM access controller 9. The transferred data is eventually stored in the DDR2-SDRAM 10. For example, the line 2 as the hatched part in the diagram 300 undergoes the data conversion and is stored in the hatched part of the DDR2-SDRAM 10 (diagram 303).

Next, when data has to be read out as an original image for the video image compression, the video image data compression/decompression processing unit 52 sends requests for the original image data to the data conversion unit 51 in units of MBs.

When the data conversion unit 51 reads out the data from the DDR2-SDRAM 10, data from the line 0 to the line 15 of the MB0 is read out first as indicated by the reference character 304. Subsequently, the data readout from the line 0 to the line 15 is performed successively in units of MBs in the order of MB1, MB2, . . . . Incidentally, the size of each MB has been determined corresponding to the data quantity in the uncompressed state. Therefore, when the MB0 after the data compression is read out as indicated by the reference character 304, for example, part of data belonging to the MB1 (or the MB1 and the MB2) in the uncompressed state is also read out.

The data conversion unit 51 performs reverse conversion (decompression) on the data of each line.

If line data of an intended MB (uncompressed state) exists in the burst length, data of the next MB part which has already been read out (nonhatched part in the thick frame 304) is retained. The burst part that is read out for the readout of the data of the MB0 is the lines 0-15 surrounded by the thick frame 304. The parts in which the data of the MB0 (formerly in the uncompressed state) has actually been stored are the hatched parts.

The data stored in the hatched parts successively undergo the reverse conversion by the data conversion unit 51 as indicated by the reference character 305 and are handed over to the video image data compression/decompression processing unit 52 as the data of the original MB0.

Data of the MB1, etc. (uncompressed state) contained in the MB0 is retained in the data conversion unit 51 for the next data reverse conversion.

The processing is continued for the MB1, MB2, etc. For the data of each line, the reverse conversion is performed on the retained data and if subsequent data is necessary, the subsequent burst is read out.

If no subsequent data is necessary, the reading of the next data is not carried out.

The amount (data quantity) of compressed line data as the result of the compression of the data of each line varies depending on the inputted image, and the burst position to be updated changes with the progress of the readout of the lines. For example, the burst read positions and the actual data positions in the case of reading out the data of the MB2 (uncompressed state) are the positions surrounded by the thick frames and the hatched positions in the drawing 306. The part handed over to the video image data compression/decompression processing unit 52 after the data reverse conversion is shown in the drawing 307.

If the data write access and the data read access are performed in the same address sequence (order), the device is required to have a data buffer of a size corresponding to the product of the vertical width and the line width of each MB (so as not to discard data that has already been read out once), perform the data read in units of lines, and successively perform the reverse conversion on the data of the MBs (MB0, MB1, MB2, . . . ) at each stage when 16 lines of data have been accumulated. Therefore, a considerable number of buffers for storing the read data are necessary. In contrast, in cases where the address sequence is changed according to the method of this embodiment, the circuit can substantially be implemented by use of a burst buffer having the size of one MB and a buffer for retaining the currently accessed bit position and memorizing the burst boundaries. Thus, the method of this embodiment is advantageous in that the cost rise can be suppressed.

Similarly, the video image data compression/decompression processing unit 52 carries out the writing and the reading of the reference images via the data conversion unit 51 of this embodiment. In this case, the data access is performed basically in units of MBs both in the writing and in the reading. Therefore, no problem occurs in particular in terms of efficiency even if the data conversion is performed successively for each MB and the data write/read is performed on each area that should originally store each MB.

Next, an embodiment different from that shown in FIG. 2 will be described below.

FIG. 3 is an explanatory drawing for explaining read/write access by means of the block access in accordance with an embodiment of the present invention. In the data write, it is also possible to successively compress and accumulate the hatched parts 401 of the MB0 shown in FIG. 3 and make access in units of bursts surrounded by the thick frame 402.

Finally, the stream data generated by the video image compression is written to the DDR2-SDRAM 10 while skipping the data compression (i.e., without executing the data compression) since the use of the lossy compression technology makes the data decoding impossible and the use of the lossless compression is also substantially ineffective for the bandwidth compression.

Next, the operation for the decompression will be explained below. The stream read out from the external memory via the stream input/output terminal 8 is outputted to the video image data compression/decompression processing unit 52 without undergoing the data conversion process in the data conversion unit 51. A decoded image of each frame is generated by decoding the inputted stream which has been encoded by the variable-length coding. Each decoded image is used as the reference image for other images and is eventually outputted via the video I/F 3 in units of lines. Therefore, while each reference image in the previous embodiment was obtained by performing the block access process, the data write in the video image decompression of this embodiment is performed in units of lines similarly to the original image area shown in FIG. 2 and each reference image is read out as a block when the reference image is referred to. In cases where the video I/F unit 3 needs data read, the data read process is changed to a process of directly reading out the data in the line direction.

As described above, it is possible to implement the circuit while reducing the cost for the buffers necessary for each process and to reduce the bandwidth by providing the device with a configuration capable of changing the addressing sequence (order) of the data-converted images depending on the purpose of use even when the same reference image area is used.

In such an image processing LSI for processing video images, data access to the same SDRAM 10 is performed generally not only by the video image compression/decompression processing unit 5 but also by a host CPU 6 for executing the system management and other processing blocks such as an image processing unit 4 for performing image processing on the input images as shown in FIG. 1.

FIG. 4 shows an example of data allocation in the SDRAM 10 in accordance with an embodiment of the present invention. The amount of access to the memory controller tends to become extremely large due to the aforementioned circumstances. Thus, there arises the need of increasing the number of lines of the internal bus, as well as the need of increasing the system clock speed, for example. Consequently, this causes an increase in the chip areas in the system, which leads to an increase in the electric power consumption. As a result, the implementation of the LSI at a low cost becomes difficult. This embodiment is capable of providing a method for resolving this problem.

Further, the data conversion unit 51 in this embodiment has a function of switching between the lossless compression and the lossy compression. In the lossless compression, image deterioration does not occur; however, the system design becomes difficult since the bandwidth reduction rate fluctuates widely depending on the pattern of the image that is processed. In contrast, the lossy compression allows to fix the compression ratio and carry out the system design under the condition; however, the purpose of use is restricted since image deterioration occurs during the lossy compression. In this embodiment, a method for resolving this problem can be provided by performing the lossless/lossy switching depending on the image to be processed, for example, FIG. 5 is a schematic diagram showing an example of combinations of the switching between the lossless compression and the lossy compression in accordance with an embodiment of the present invention. In this embodiment, an operation mode is specified as shown in FIG. 5. For the specified operation mode and each frame, whether the compression method at the time of data access is lossless or lossy is specified. This makes it possible to achieve the optimum image quality and the bandwidth reduction effect in a well balanced manner according to the user's request.

By the data conversion process executed by the data conversion unit 51, the amount of data access to the SDRAM access controller 9 can be reduced. Consequently, effects of reducing the system cost and lowering the electric power consumption can be achieved.

In the above embodiments of the present invention, it was first assumed that the images with the full HD resolution are compressed and decompressed according to H.264/AVC (ISO/IEC14496-10). Especially, the compression/decompression processing in conformity with the H.264 standard has been assumed in the above embodiments. However, it is obvious that the present invention is effective in other processes such as those performing the interframe prediction (e.g., MPEG 1, 2 and 4).

It is also obvious that the data access method is not restricted to those described in the above embodiments; similar effects can be achieved also by changing the combination of the block-direction access (access in the block direction) and the line-direction access (access in the line direction) between the data read and the data write (in consideration of an I/F of another block) and changing the size/area of each of memory areas used for successively storing the data.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A video image compression/decompression device for performing compression and decompression of video image data, comprising:

a video image data compression/decompression processing unit which outputs first video image compression data obtained by performing data compression on a video image signal inputted to the video image compression/decompression device by performing interframe prediction on images of the video image signal, and outputs a video image signal obtained by performing data decompression on video image compression data inputted to the video image compression/decompression device; and a data conversion unit which obtains second video image compression data by performing data compression on the video image signal to undergo the data compression by the video image data compression/decompression processing unit and on a reference image signal to be referred to at the time of performing the interframe prediction by use of a method different from the data compression by the video image data compression/decompression processing unit, writes the second video image compression data to a memory provided as an external or built-in memory of the video image compression/decompression device, and performs data decompression on the second video image compression data read out from the memory, wherein the data conversion unit changes a memory address sequence, which is used at the time of writing/reading the second video image compression data to/from the memory, between the data writing and the data reading in the same image frame, wherein the memory address sequence is changed based off of a selection between either a lossless compression mode or a lossy compression mode, wherein the data conversion unit generating the second video image compression data compresses data of scan lines of the video image signal by segmenting the data into a plurality of bursts in units of bursts having a first data quantity and then successively writes the bursts each of which has been compressed into a second data quantity to the memory as data in the scanning direction of the scan lines, and the data conversion unit reading out the data written to the memory reads out the data corresponding to the first data quantity from the data of the scan lines successively in a direction orthogonal to the scan lines.

2. A video image compression/decompression device for performing compression and decompression of video image data, comprising:

a video image data compression/decompression processing unit which outputs first video image compression data obtained by performing data compression on a video image signal inputted to the video image compression/decompression device by performing interframe prediction on images of the video image signal, and outputs a video image signal obtained by performing data decompression on video image compression data inputted to the video image compression/decompression device; and a data conversion unit which obtains second video image compression data by performing data compression on the video image signal to undergo the data compression by the video image data compression/decompression processing unit and on a reference image signal to be referred to at the time of performing the interframe prediction by use of a method different from the data compression by the video image data compression/decompression processing unit, writes the second video image compression data to a memory provided as an external or built-in memory of the video image compression/decompression device, and performs data decompression on the second video image compression data read out from the memory, wherein the data conversion unit changes a memory address sequence, which is used at the time of writing/reading the second video image compression data to/from the memory, between the data writing and the data reading in the same image frame, wherein the memory address sequence is changed based off of a selection between either a lossless compression mode or a lossy compression mode, wherein the data conversion unit generating the second video image compression data compresses data of scan lines of the video image signal by segmenting the data into a plurality of bursts in units of bursts having a first data quantity and then successively writes the bursts each of which has been compressed into a second data quantity to the memory as data in a direction orthogonal to the scanning direction of the scan lines, and the data conversion unit reading out the data written to the memory reads out the data corresponding to the first data quantity from the data of the scan lines successively in order of the writing.

* * * * *